9544X

Chamberlin & Cleflin,

Hay Press.

Patented Mar. 30, 1836.

AM. PHOTO-LITHO. CO. N.Y. (OSBORNE'S PROCESS)

9544X

Mar. 30, 1836

Adrastus R. Chamberlain & Artemas Cleflin. Richmond Maine

Letters Patent.

The Schedule referred to in these Letters Patent and making part of the same containing a description in the words of the said A R Chamberlain and Artemas Cleflin themselves of their improvement in pressing Hay Hops &c To all to whom these presents shall come. Be it known that Adrastus R. Chamberlain and Artemas Cleflin of Richmond in the County of Lincoln and State of Maine have invented a new and useful improvement in the press for Hay Hops Cotton and other materials and for lifting burdens, and that the following is a full and exact description of the construction and operation of the said machine as invented or improved by us.

Figure 1:
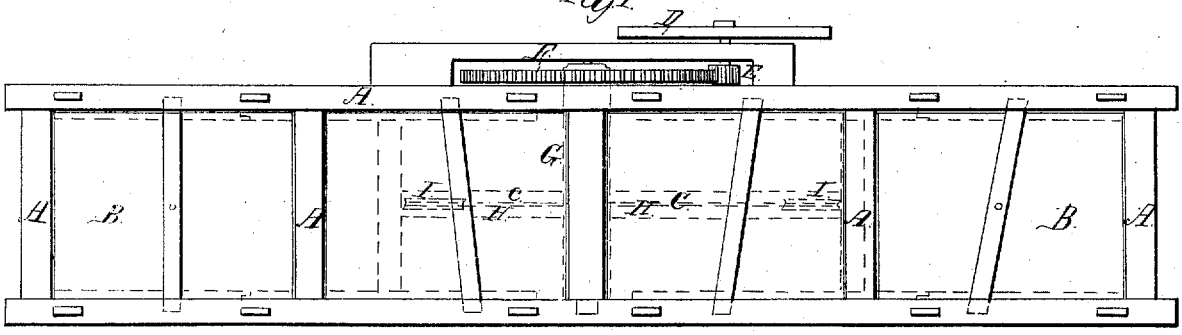
Figure 2:
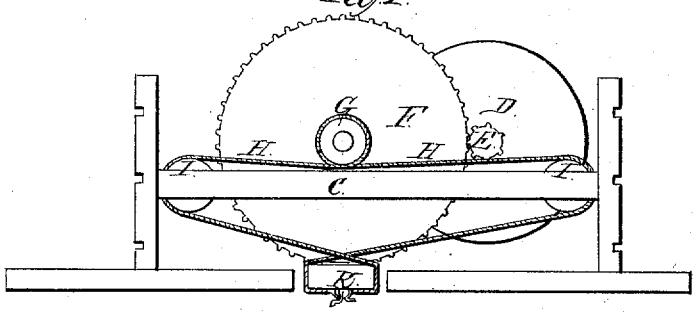
Figure 3:
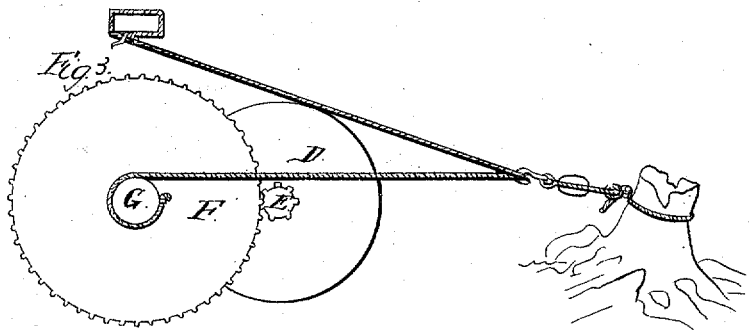

Reference being made to accompanying drawings. Fig 1. represents the machine as in action for pressing Hay, Cotton, Hops or any other material which it may be desirable to compress into a small compass. A.A. is the frame work which may be made of any required size say twenty four feet long five and a half high and three or four feet wide. B.B represents the Boxes into which the Hay or other substance is put in the usual way. there is a box at each end so that one may be filled while the other is pressing. C.C. are the pistons. D. is the wheel to which is applied the power either by crank or by ropes when horses or oxen are used. E is a pinion on the shaft of D and moves with it. F is a large cog wheel which mash es into the teeth of the pinion E. G is the shaft of F around this shaft passes a strong chain H H. which also passes over trucks or pullies in each end of the piston rod at J.J. and is made fast to a strong girt below at K. - Fig 2. represents the power or combination of powers divested of the frame work. Fig 3. represents the application of the same power to the lifting of stumps or other heavy burdens. Mode of operation. In order to use our machine as a press, take off the tops of the Boxes B B and throw in the substance to be pressed, treading it down hard. When thus filled replace the top & key it down solid by the large Bars running in between it and the top beams of the frame then apply the power at D. The bands &c are disposed in the box in the usual mode of pressing such substances. For lifting Stumps or other Burdens. We have a moveable pulley or tackle which we hook on to the stump or burden and the chain H H. instead of passing through or over the pulleys J.J. in the piston passes thro the tackle on the stump and the end of the chain instead of being fastened below to the beam at K is fastened to a similar beam above. Claims. What we spe /6. 9544x Mar 30, 1836 ecifically claim as our invention and for which we request an exclusive right is ——
1. The application of the pulley as used by us, in a single or double press, or in other words
the mode in which we apply and use the chain as above described. 2 The application
and use of our machine to the sawing of stumps or other heavy burdens. In testimony
that the above is a true specification of our one improvement as above described We have
hereto set our hands this twenty third day of November in the year of our Lord 1835.

A. R. Chamberlain
Artemas Claflin

Exd. Witnesses
W.G.C. Geo Evans
J. W. Dearborn (608 words)

Drawing